Dec. 26, 1939.    R. W. BROWN    2,184,933
VEHICLE SUSPENSION
Filed Feb. 17, 1937    4 Sheets-Sheet 1
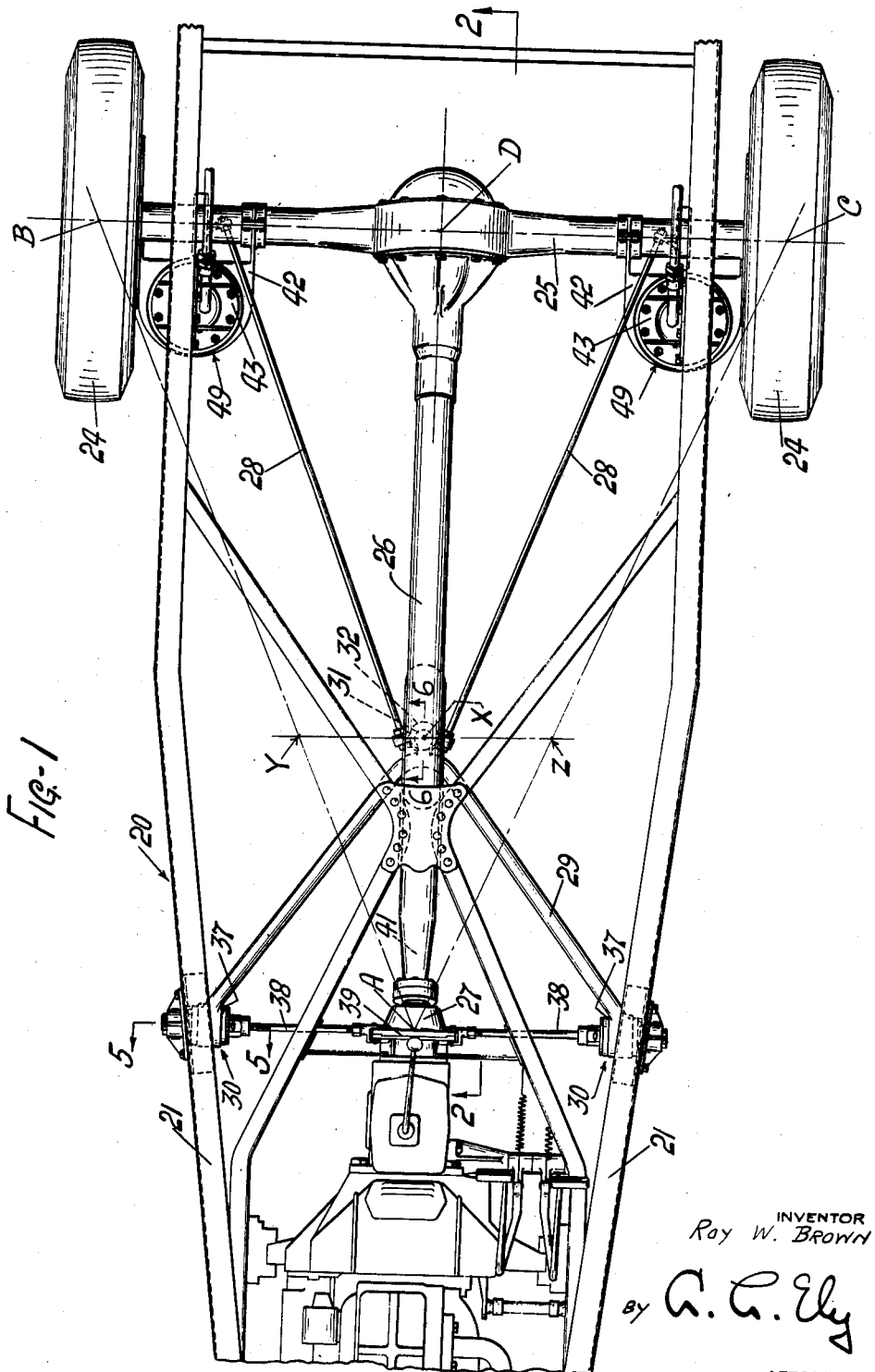
INVENTOR
Roy W. Brown
By G. G. Ely
ATTORNEY Dec. 26, 1939.  R. W. BROWN  2,184,933
VEHICLE SUSPENSION
Filed Feb. 17, 1937  4 Sheets-Sheet 2
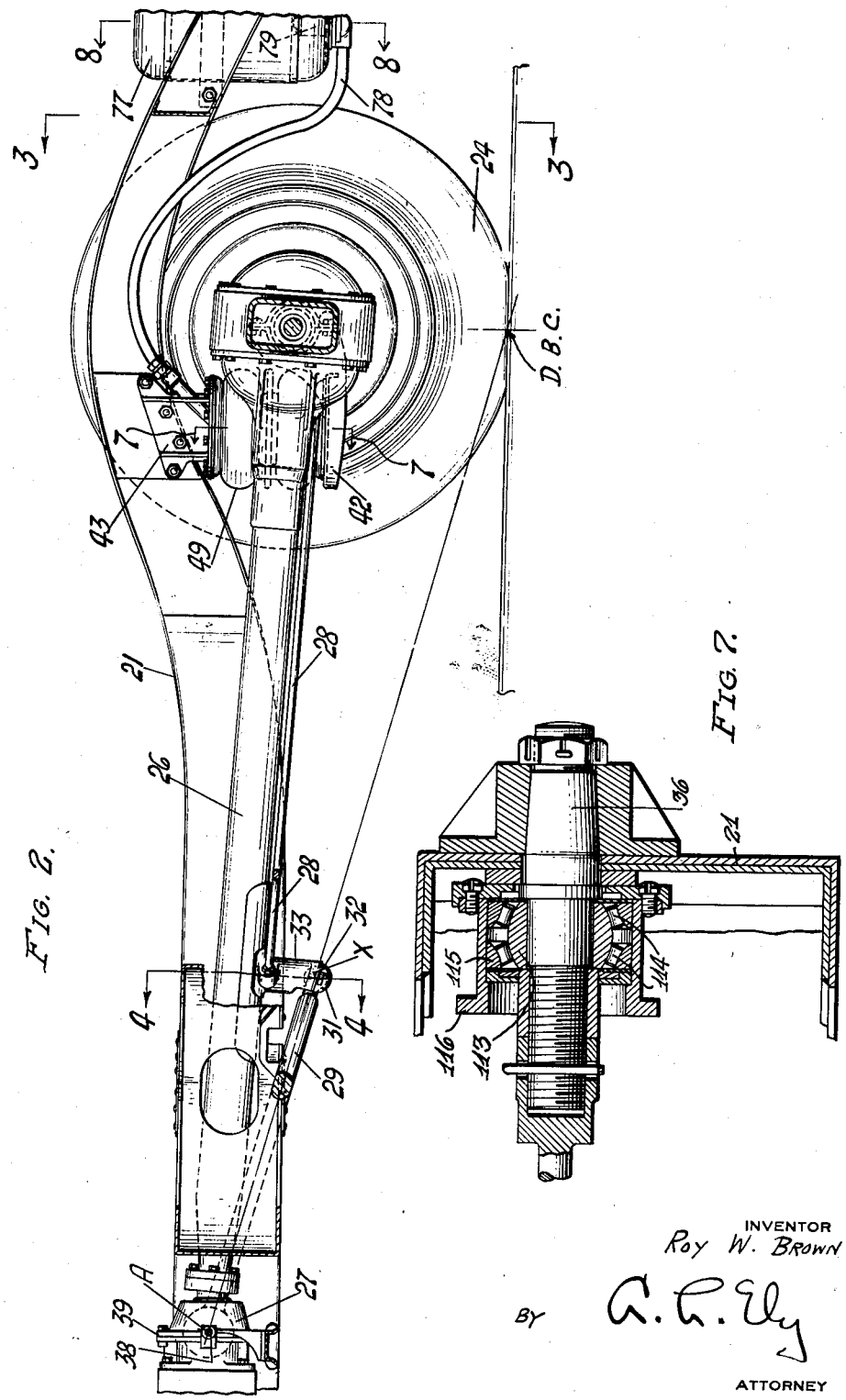
INVENTOR
Roy W. Brown
BY  G. G. Ely
ATTORNEY Dec. 26, 1939.   R. W. BROWN   2,184,933
VEHICLE SUSPENSION
Filed Feb. 17, 1937   4 Sheets-Sheet 3
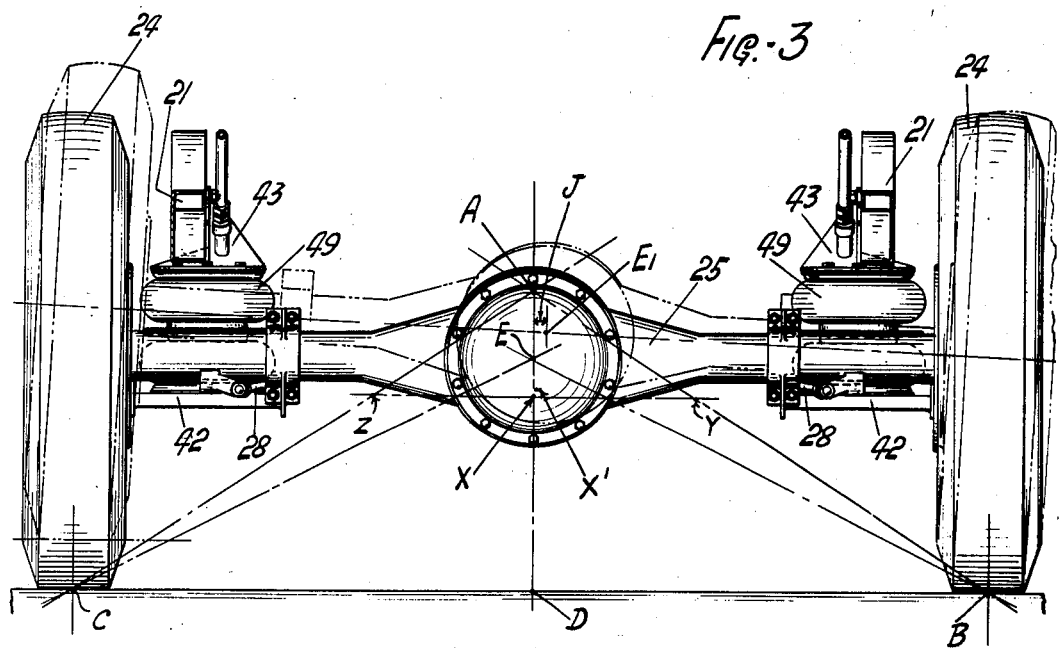
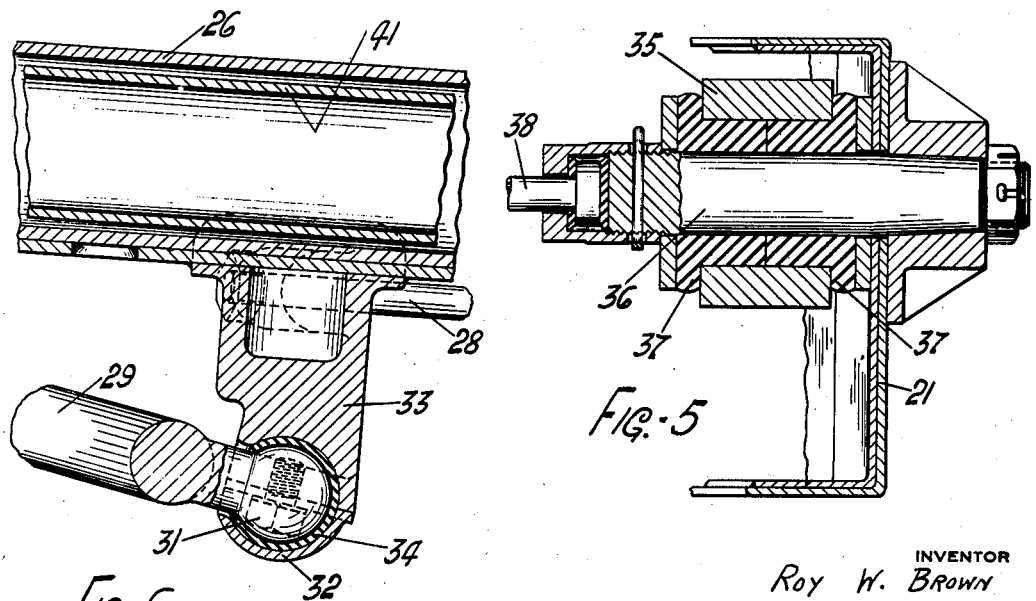
INVENTOR
Roy W. Brown
ATTORNEY Dec. 26, 1939.　　　R. W. BROWN　　　2,184,933
VEHICLE SUSPENSION
Filed Feb. 17, 1937　　　4 Sheets-Sheet 4

INVENTOR
Roy W. Brown
BY
ATTORNEY

Patented Dec. 26, 1939

2,184,933

UNITED STATES PATENT OFFICE 2,184,933

VEHICLE SUSPENSION

Roy W. Brown, Akron, Ohio, assignor to The Firestone Tire & Rubber Company, Akron, Ohio, a corporation of Ohio Application February 17, 1937, Serial No. 126,251

14 Claims. (Cl. 280—124)

This invention relates to improvements in pneumatic suspension devices of a type particularly adapted for use on motor vehicles and has for its primary object to provide such a device which is simple in construction, inexpensive to manufacture and efficient in operation.

Another object is to provide an improved stabilizing means for the rear end of a vehicle adapted to form a connection between the body and running gear of a vehicle which will permit substantially free relative vertical and pivotal movement therebetween while substantially eliminating lateral relative displacement therebetween in order that the steering of the vehicle will be substantially unaffected by relative movement between the body and running gear incident to normal operation of the vehicle.

Another object is to devise a vehicle construction wherein the torque tube and rear axle are so connected by torque rods to the chassis that angular displacement of the rear axle will not result in lateral displacement of the chassis.

A further object is to devise a vehicle construction in which a pneumatic suspension device is combined with a rear wheel positioning mechanism for improving the riding qualities of the vehicle.

Another object is to devise a vehicle construction in which a pneumatic suspension device is combined with the torque tube and rear axle for reducing passenger fatigue due to movement of the vehicle body incident to operation of the vehicle.

Still another object is to devise an automobile construction in which a pneumatic suspension device is combined with a torque tube and rear axle in such manner as to minimize the horizontal displacement of the body of the vehicle when the rear wheels are relatively displaced in a vertical direction.

With the objects above indicated and other objects hereinafter explained in view, the invention consists in the construction and combination of elements hereinafter illustrated, described and claimed.

Referring to the drawings,

Figure 1 is a plan view of a motor vehicle chassis and suspension device combination embodying the present invention;

Figure 2 is a slightly enlarged scale longitudinal cross-section of the chassis taken on the line 2—2 of Figure 1;

Figure 3 is a rear elevational cross-section taken on the line 3—3 of Figure 2;

Figure 5 is an enlarged scale detail cross-section taken on the line 5—5 of Figure 1;

Figure 6 is an enlarged scale detail cross-section taken on the line 6—6 of Figure 1;

Figure 7 is a modification of the detail cross-section shown in Figure 5.

Figure 4:
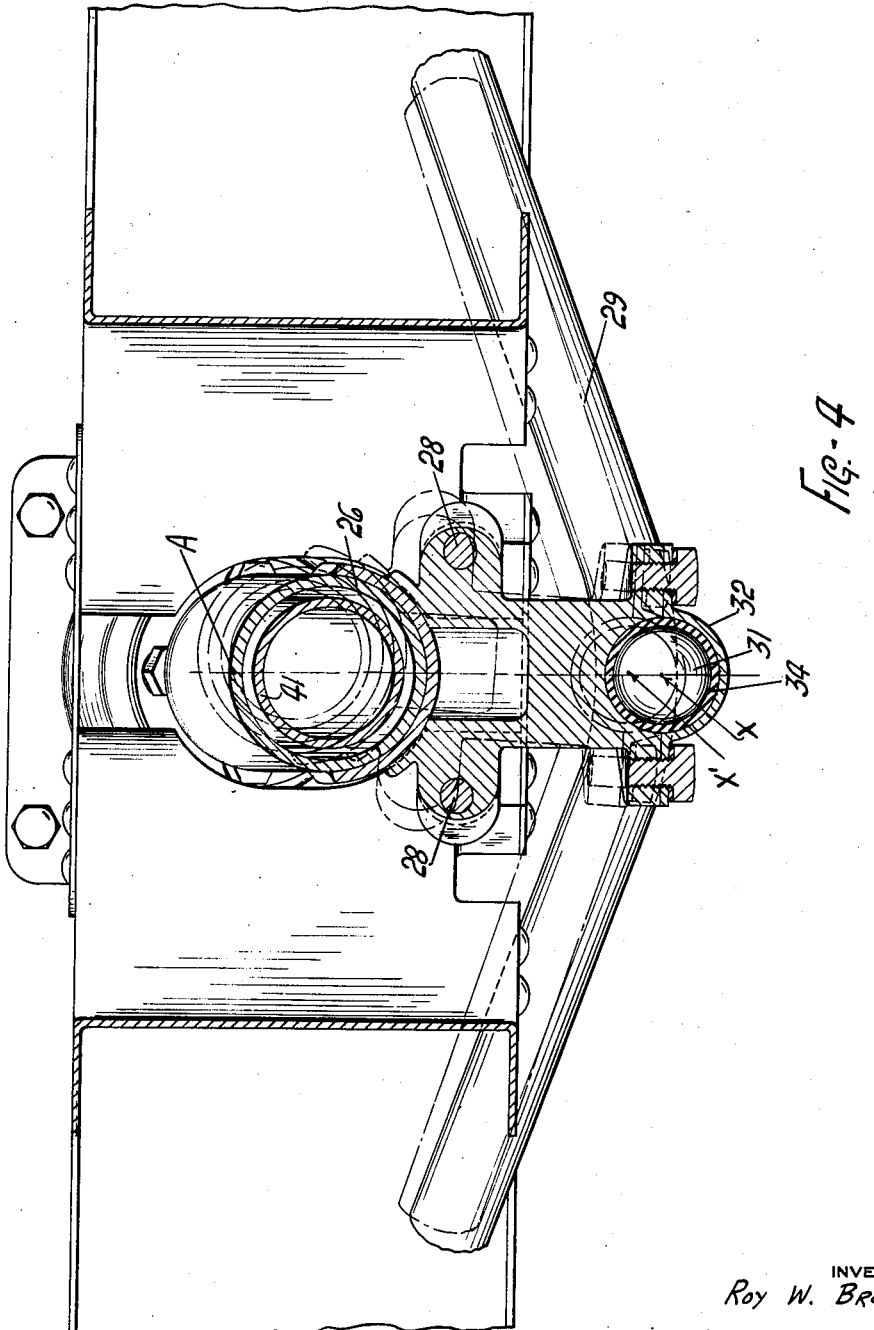
Figure 4 is a further enlarged scale cross-section taken on the line 4—4 of Figure 2.

The rear wheels 24 are mounted in the usual manner by means of the rear axle housing 25 which is connected to the frame through torque rod 26 and universal joint 27. Tie rods 28 have their respective ends attached to the torque rod in the rear axle housing to hold the axle housing in proper position with respect to the torque rod. A wishbone torque rod member 29 is pivoted to the frame at joints 30 and is formed at its central rearward portion with a ball 31 enclosed within a socket 32 on the lower end of a depending boss 33 which is attached to torque rod 26 between the universal joint 27 and the rear axle housing 25 as shown in detail in Figure 6. The ball and socket joint 31, 32 may have interposed therein a rubber lining 34 to eliminate the necessity of lubrication.

Referring to Figure 5, which is a detail view of joint 30, the wishbone 29 is formed at each spaced end with an eye portion 35 pivoted about a stud shaft 36 secured in the side frame member 21. Rubber bushings 37 are interposed between eye member 35 and stud shaft 36 to afford a hinge joint not requiring lubrication and one which will afford a limited degree of angular displacement of the wishbone with respect to the frame, permitting the wishbone to have slightly angular movement with respect to the center line of the chassis as well as permitting the ball joint 31 of the wishbone to move in a vertical plane.

In order to take the lateral load exerted by the torque tube 26 on the wishbone 29, brace members 38 are secured at their outer ends to the stud shafts 36 and extend transversely of frame 20 and are connected at their inner ends to a ring member 39 which encircles the universal joint of the propeller shaft 41. The brace members supplement the usual support of the transmission and universal joint of the automobile chassis.

One of the main features of this invention is the arrangement whereby lateral displacement of the frame 20 is greatly minimized when the rear wheels 24 are moved up or down in unison or relative to each other, as when the vehicle is traveling on an uneven surface. To this end the ball and socket joint 31, 32 is arranged to lie on a line AXD determined by the point of oscillation of the universal joint 27 of the propeller shaft 41 and the ground midway between the contact of the rear wheels on the ground, respectively, as shown in Figures 1, 2 and 3. The ball and socket joint 31, 32 will move in a vertical plane about its joints 30 when either or both of the rear wheels 24 is raised or lowered by passing over road irregularities. Since the wishbone 29 is pivotally connected to the torque tube at point X which lies on the longitudinal axis of oscillation of the rear axle housing, the frame 20 will not be displaced laterally an appreciable amount when either of the rear wheels is displaced up or down relative to the other rear wheel. Therefore lateral oscillation of the car frame and body is substantially eliminated, resulting in greater safety and comfort and reduced fatigue of the passengers.

According to this invention, pneumatic supporting devices 49 are placed between either side of the frame 20 and the rear axle housing 25, the devices 49 being attached to brackets 42 which may be clamped to the housing in any convenient manner.

Although, as shown in Figure 1, the brackets 42 are placed to one side of the center of the axle housing, it is to be understood that the pneumatic bellows 49 could be supported directly above the center line of the axle housing and the upper end of the devices 49 suitably secured to the frame 20. As shown in Figures 1, 2 and 3 the upper ends of the pneumatic bellows 49 are fixed to brackets 43 which are in turn bolted or otherwise suitably secured to the frame 20.

In Figure 7 I have illustrated a modification of the bearings for pivotally connecting the wishbone 29 to the frame 20 in order that slight distortion of the frame members under load will not produce excessive stress in the wishbone. In this form of the invention a roller bearing is provided having a spherical inner race 113 surrounding the stub shaft 36, which is carried by the frame 20. Two series of rollers 114, having the same radius as that of the spherical inner race 110, are placed between the latter and an outer race 115. A flanged sleeve 116 fits over the outer race and is adapted to fit inside of the eyelets 35 of the ends of the wishbone 29.

Since the bellows 49 are made of very resilient material, they readily permit relative lateral movement between the axle housing 25 and the frame 20 due to the pivotal action of the wheels about their point of contact with the ground. Referring particularly to Figure 3, if the left hand wheel is elevated as indicated in dot and dash outline, all of the points on the housing 25 move substantially in arcs having a common center, approximately at B, the point of contact of the right hand wheel with the ground. Taking the center E of the rear axle housing as typical, this point will move up and to the right to a point indicated at E'. Since the frame 20 is pivotally connected to the torque tube below its center on line AXD through the wishbone 29, there is substantially no lateral movement imparted to the frame 20 when either of the rear wheels goes over high places in the road bed. In Figure 3, the relative amounts of movement of the center of the rear axle housing, and the center of the ball 31 are clearly shown when the left hand wheel is raised to the position shown in dotted outline. The center of the housing moves from E to E', while the center of the ball joint 31 moves from X to X'. It is to be noted that the center of the axle housing has moved laterally an amount indicated by J, but the center of the ball joint 31 has moved very slightly laterally. The reason for this is that point E is situated above the plane ABDC determined by the universal joint of the driving shaft, and the points of contact of the rear wheels with the ground, while point X is located in this plane.

All points in this plane will be displaced laterally relative to the straight-ahead path of the vehicle by an amount less than any point above or below this plane when either of the rear wheels is moved up or down relative to the other wheel and relative to the body. When, for example, the left hand wheel is moved up or down relative to the right wheel, the running gear and rear wheels will pivot about the line A—B and therefore, theoretically there is no lateral movement of any point on this line relative to the straight-ahead path of the vehicle. It also follows that when the right hand wheel is moved up or down relative to the other wheel, the running gear and rear wheels will pivot about the line and therefore theoretically there is no lateral movement of any point on this line relative to the straight-ahead path of the vehicle. It will be readily understood that in order to eliminate all lateral movement of the body relative to the straight-ahead path of the vehicle, the ball joint 31 should be at point Y for up and down movements of the left hand wheel and at point Z for up and down movements of the right hand wheel. However, for all practical purposes, the ball joint may be located at point X on the line AXD, which bisects the angle formed by the lines A—B and A—C, without causing excessive lateral displacement of the body due to up and down movements of the vehicle wheels incident to the operation of the vehicle over an uneven road bed.

In accordance with the foregoing description of the present invention it will be readily understood that means are provided for maintaining the running gear and body of a vehicle against substantial relative lateral movement, without interference with the relative vertical movement. The construction is particularly adapted for use with a vehicle having a suspension means which is incapable of lateral or longitudinal stability, such as a flexible pneumatic cushion. It is to be understood, however, that the positioning means may also be used on a vehicle having the conventional or standard springing arrangements. It is also obvious that the invention may be employed in stabilizing a solid front axle.

What is claimed is:

1. In a vehicle having in combination a frame, a rear axle housing having drive wheels, and a torque tube rigidly attached at one of its ends to said housing centrally thereof and at right angles thereto and pivotally connected at the other of its ends to said frame through a universal joint, means pivotally connected to said torque tube and to said frame for pivotally connecting said frame to said torque tube intermediate the ends of said torque tube and directly below the latter, about an axis determined by the universal joint and a point midway of a line joining the points of contact of the wheels with the roadbed the lowermost portions of said wheels and the pivotal point of said universal joint.

2. In a vehicle having in combination a frame carrying a motor, a torque tube and rear axle housing carrying drive wheels and connected to said frame through a universal joint, a propeller shaft housed in said torque tube and having a universal driving connection with said motor adjacent said universal joint to permit oscillatory movement between said frame and said drive shaft, means pivotally connecting said torque tube to said frame at a point below said torque tube spaced from said universal joint, about an axis determined by the universal joint and a point midway of a line joining the points of contact of the wheels with the roadbed.

3. In a vehicle having in combination a frame, a solid transverse axle, wheels supported on said axle, a torque member rigidly secured to said axle and having a universal connection with said frame, means pivotally connected to said frame at spaced points on an axis transverse to said frame and connected to said torque member at a point longitudinally displaced from said universal connection and in the plane passing through said universal connection and the lowermost points on said wheels.

4. A vehicle having a frame, an axle housing and torque tube assembly, a universal joint connecting said assembly to said frame, to permit relative angular movement between said frame and said torque tube, a suspension system comprising a plurality of flexible load supporting devices having substantially no resistance to relative movement in directions transverse to its weight supporting direction, and means pivotally connecting said torque tube to said frame at one of said points of connection lying directly below said torque tube in the plane passing through the points of contact of said wheels with the ground and said universal joint, and spaced from the latter, one of said points of connection lying in a vertical plane passing through substantially the longitudinal axis of said torque tube.

5. In combination, a vehicle having a frame, a running gear comprising a pair of wheels, an axle and a radius member, a universal joint connecting said radius member to said frame, and a stabilizing member for connecting said frame to said running gear, said stabilizing member being pivoted to said frame at two spaced points on a transverse axis passing through the center of said universal joint and pivoted to said running gear about a point in the plane determined by the centers of contact of the wheels with the roadbed and the center of said universal joint.

6. In combination, a vehicle having a frame, a running gear comprising a pair of wheels, an axle and a radius member, a universal joint connecting said radius member to said frame, and a stabilizing member for connecting said frame to said running gear, said stabilizing member being pivoted to said frame at two spaced points on a transverse axis passing through the center of said universal joint and pivoted to said running gear about a point in the plane determined by the centers of contact of the wheels with the roadbed and the center of said universal joint, said point lying in a line passing through the center of said universal joint and a point midway of the line connecting the centers of contact of the wheels with the roadbed.

7. In a vehicle, a frame, a running gear carrying wheels, a universal connection between said frame and said running gear, second means for connecting said frame and running gear in a fixed vertical plane centrally of said frame and in a plane passing through said first universal connection and the points of contact of the wheels with the roadbed, and resilient load supporting means between said running gear and said frame.

8. In combination, a vehicle having a frame, a running gear comprising a pair of wheels, an axle and a radius member, a universal joint connecting said radius member to said frame, and a stabilizing member for connecting said frame to said running gear, said stabilizing member being pivoted to said running gear about a point in the plane determined by the centers of contact of the wheels with the roadbed and the center of said universal joint and said member being pivoted to said frame at points disposed transversely thereof and in said first named plane.

9. A vehicle comprising in combination a frame and a running gear having a pair of wheels, resilient load supporting means connected between said gear and said frame, and means for pivotally connecting said gear and said frame about an axis determined by the intersection of the central vertical longitudinal plane of the vehicle and a plane passing through the lowermost point of said wheels and a point on said frame in said central plane.

10. A vehicle comprising in combination a frame, a rear axle housing, a torque tube secured to said housing and having a universal connection with said frame, resilient load supporting devices connected between said housing and said frame, a V-shaped stabilizing member having its spaced ends pivotally connected to said frame through universal joints on an axis passing through said universal connection, the apex of said stabilizing member having a pivotal connection with said torque tube at a point displaced from said universal connection of the frame with the torque tube.

11. A vehicle comprising in combination a frame, a rear axle housing carrying wheels, a torque tube secured to said housing and having a universal connection with said frame, resilient load supporting devices connected between said housing and said frame, stabilizing means pivotally connected to said frame at spaced points on an axis transverse thereof and passing through said universal connection, said stabilizing means having a pivotal connection with said torque tube at a point displaced from said universal connection of the frame with the torque tube and in a plane passing through said first universal connection and through the points of contact of said wheels with the ground.

12. A vehicle comprising in combination a frame, a rear axle housing, a torque tube secured to said housing and having a universal connection with said frame, resilient load supporting devices connected between said housing and said frame, a V-shaped stabilizing member pivotally connected to said frame on an axis transverse thereof and passing through said universal connection, the apex of said V-shaped member having a pivotal connection with said torque tube at a point displaced from said universal connection of the frame with the torque tube.

13. A vehicle comprising in combination a frame and running gear having a solid transverse axle and carrying wheels, said running gear having a universal connection with said frame, lateral stabilizing means for said running gear pivoted to said frame at spaced points on an axis extending transversely of said frame and passing through said universal connection, said stabilizing means having a universal connection with said running gear at a point displaced from said first universal connection, said second universal connection also being in a plane passing through said first universal connection and the points of contact of the wheels with the ground.

14. A vehicle comprising in combination a frame, a rear axle housing, a torque tube secured to said housing and having a universal connection with said frame, resilient load supporting devices connected between said housing and said frame, a V-shaped stabilizing member, a pair of rubber bushings for pivotally connecting the spaced ends of said V-shaped member to said frame on an axis transverse thereof and passing through said universal connection, the apex of said V-shaped member having a pivotal connection with said torque tube at a point displaced from said universal connection of the frame with the torque tube.

ROY W. BROWN.

CERTIFICATE OF CORRECTION.

Patent No. 2,184,933. December 26, 1939.

ROY W. BROWN.

It is hereby certified that error appears in the printed specification of the above numbered patent requiring correction as follows: Page 2, second column, lines 67, 68 and 69, claim 1, strike out the words "the lowermost portions of said wheels and the pivotal point of said universal joint"; page 3, first column, line 29, claim 4, beginning with "one of" strike out all to and including "tube" in line 36, same claim, and insert instead the following -

> points fixed against lateral movement relative to said
> frame in the plane passing through the points of contact
> of said wheels with the ground and said universal joint,
> and spaced from the latter, one of said points of connection
> lying directly below said torque tube;

and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.